United States Patent [19]
Phillips

[11] Patent Number: 6,119,540
[45] Date of Patent: *Sep. 19, 2000

[54] YOKE APPARATUS FOR RACK AND PINION

[75] Inventor: Edward H. Phillips, Troy, Mich.

[73] Assignee: Techco Corporation, Southfield, Mich.

[*] Notice: This patent is subject to a terminal disclaimer.

[21] Appl. No.: 09/026,738

[22] Filed: Feb. 19, 1998

Related U.S. Application Data

[60] Provisional application No. 60/046,767, May 14, 1997.

[51] Int. Cl.⁷ ...................................................... F16H 1/04

[52] U.S. Cl. ................................ 74/422; 74/498; 384/42

[58] Field of Search ......................... 74/422, 498; 384/42, 384/37

[56] References Cited

U.S. PATENT DOCUMENTS

| | | | |
|---|---|---|---|
| 3,499,691 | 3/1970 | Baier . | |
| 3,680,443 | 8/1972 | Jenvey | 91/375 A |
| 4,271,716 | 6/1981 | Carduner | 74/422 |
| 4,402,618 | 9/1983 | Fortmann et al. | 384/107 |
| 4,475,413 | 10/1984 | Higuchi | 74/422 |
| 4,515,486 | 5/1985 | Ide | 384/117 |
| 4,683,769 | 8/1987 | Mochizuki et al. | 74/422 |
| 4,691,583 | 9/1987 | Taig | 74/422 |
| 4,709,593 | 12/1987 | Takeuchi | 74/498 |
| 4,724,717 | 2/1988 | Chikuma | 74/422 |
| 4,788,878 | 12/1988 | Morita et al. | 74/422 |
| 4,793,433 | 12/1988 | Emori et al. | 180/143 |
| 4,936,157 | 6/1990 | Kotake et al. | 74/422 |
| 4,939,947 | 7/1990 | Toyoshima et al. | 74/422 |
| 5,058,448 | 10/1991 | Kiyooka et al. | 74/422 |
| 5,203,216 | 4/1993 | Hasegawa | 74/498 |
| 5,265,691 | 11/1993 | Konishi et al. | 180/148 |
| 5,272,933 | 12/1993 | Collier et al. | 74/498 |
| 5,316,043 | 5/1994 | Phillips | 137/625.23 |
| 5,746,285 | 5/1998 | Yonezawa | 74/422 |
| 5,802,919 | 9/1998 | Phillips | 74/422 |
| 5,845,532 | 12/1998 | Phillips | 74/422 |

FOREIGN PATENT DOCUMENTS

| | | | |
|---|---|---|---|
| 61-193966 | 8/1986 | Japan | 180/147 |
| 6-92243 | 4/1994 | Japan | 180/184 |

OTHER PUBLICATIONS

Chilton—Taurus/Sable/Continental, Suspension and Steering, 1986–89, Book 7830, p. 329.

*Primary Examiner*—David A. Bucci
*Assistant Examiner*—Chong H. Kim
*Attorney, Agent, or Firm*—Gifford, Krass, Groh, Sprinkle, Anderson & Citkowski, P.C.

[57] ABSTRACT

A yoke apparatus 34 is useful with a steering system having a pinion gear 20 and a longitudinally movable rack 24 engaged with the pinion gear 20. The yoke apparatus 34 comprises a bearing disc 36 received in the aperture 32, and a pair of biasing members 40 and 38 disposed in parallel with one another, each biasing the bearing disc 36 against the rack 24. This in turn biases the rack 24 against the pinion gear 20. The biasing members 40 and 38 have different spring constants and different compliances. Preferably, one of the biasing members 40 and 38 is a compression spring member 40 while the other is an elastomeric O-ring member 38, or other elastomeric member having a highly non-linear compliance. The yoke apparatus 34 also preferably comprises a plug 42 adjustably received in the aperture 32 which applies an axial load to the pair of biasing members 40 and 38. The bearing disc 36 is preferably barrel-shaped and includes a short circumferential outer surface 54 having a diameter formed for sliding engagement with a smooth portion 33 of the aperture 32, about which the bearing disc 36 can pivot in response to an applied lateral shock. The yoke apparatus 34 is of compact design and may be substituted in a conventional rack-and-pinion steering gear to substantially eliminate shock and rattle, and significantly improve its smoothness of operation. The support provided to the bearing disc 36 permits proper alignment and improved lubrication of its support surfaces 52 so that the rack 24 moves smoothly in either direction with minimal hysteresis due to Coulomb friction.

7 Claims, 2 Drawing Sheets

YOKE APPARATUS FOR RACK AND PINION

CROSS-REFERENCE TO RELATED APPLICATION

This application claims priority from Provisional U.S. Patent application Ser. No. 60/046,767, entitled "Yoke Apparatus For Rack And Pinion", filed May 14, 1997.

BACKGROUND OF THE INVENTION

I. Field of the Invention

The present invention is directed to a yoke apparatus for use with a rack-and-pinion steering system.

II. Description of the Prior Art

Automotive steering systems typically include a housing having a rack driven by a pinion gear. Rotation of a steering wheel turns the pinion gear. The pinion gear meshes with a plurality of teeth formed on the rack to drive the rack in one of two reciprocal directions. The rack in turn is connected to a pair of dirigible wheels. In addition, many automobile steering systems comprise a rotary control valve which is operable to supply pressurized fluid to move a double-acting hydraulic cylinder or actuator to assist translation of the rack.

In order to keep the teeth of the pinion gear and the rack in engagement, such steering systems employ a yoke apparatus. The yoke apparatus includes a bearing member (also referred to as a bearing disc) which is biased to force the rack towards the pinion gear. The bearing member has a pair of spaced apart bearing surfaces which slidingly contact the surface of the rack opposite the teeth of the rack. The bearing member is slidingly mounted in a housing bore which is formed in a nominally orthogonal manner with reference to the rack's intended position. This results in a nominal alignment of the bearing surfaces along an axis which extends coaxially with the axis of translation of the rack. A single biasing member, such as a coil spring or rubber O-ring, is mounted in the housing bore to force the yoke apparatus against the rack and bias the bearing surfaces in order to force the teeth of the rack against the teeth of the pinion gear. Thus, the yoke apparatus operates to nominally guide the rack along the axis of translation and hold the teeth of the rack and pinion in mesh during the application of torque to the pinion gear.

In practice, the use of an elastomeric or rubber O-ring as the single biasing member has been unacceptable. The O-ring suffers inelastic deformation ("creep") under pressure over a very short time, on the order of one or two years, and thus loses its ability to adequately bias the yoke against the rack. Moreover, with either a spring or an elastomeric O-ring as the single biasing member, it is not possible to maintain the axis of translation of the rack orthogonal to the axis of the housing bore. This is because of the tolerances involved in forming the housing bore, rack, and pinion gear. Accordingly, it has been found that the axis of translation of the rack may be angled with respect to the axis of the bearing surfaces of the bearing member, and may even undulate as a function of rotational motion of the pinion. When so misaligned, one end of each of the support surfaces engage the rack while opposite ends of the support surfaces are spaced away from the rack. As a further result, the bearing member itself may suffer angular misalignment within the bore and jam. In fact, such yoke assemblies may be said to be over constrained or to be of non-kinematic design.

For the above reasons, the rack is often held from smooth movement in one, or both, directions of travel. This is particularly so when the rack travels in a direction from the contacting ends towards the non-contacting ends of the support surface. The edges resist movement of the rack and the rack tends to hesitate and jerk in its movement. However, movement of the rack in an opposite direction tends to produce a smoother, less resistant movement. Frequently, the discontinuous or halting movement of the rack will be tactilly sensed by the driver.

The spring is located in an adjuster plug which is threadably inserted in the outer portion of the housing bore. During the assembly of the yoke apparatus, the adjuster plug is rotatably driven into contact with the bearing member with a nominal torque value of perhaps 50 in lbs. to provide a rotational position reference. Because of the above noted tolerances involved in forming the housing bore, rack and pinion gear, there results a soft contact between the adjuster plug and the bearing member, and thus an imprecise rotational position reference. For this reason, the adjuster plug must then be backed off by an angle in the order of 30° in order to ensure interference free operation in the manner described above. This results in an indefinite stop position of the bearing member should a torque level be applied that is sufficient to overcome the spring bias.

In operation, rack-and-pinion assemblies are often subject to conditions known as "shock" and "rattle". Shock most often occurs when the dirigible wheels are subject to dissimilar impacts such as encountering a pothole or when crossing obliquely disposed railroad tracks or similar road surface discontinuities. One cause of shock is thought to be physical separation followed by abrupt contact between the bearing member and top surface of the adjuster plug. Rattle tends to be caused by lateral and rotational motions and resulting impacts within the housing by the yoke apparatus elements when the rack is subject to a succession of impacts when traversing an uneven surface such as a rough unpaved road or an open grassy field. In any case, shock and rattle are typically treated by tightening up various clearances or adding elastomeric guide elements, and as a last resort, by significantly increasing the biasing spring force. Unfortunately, increasing the biasing spring force (by selecting a spring with a high spring constant) undesirably increases the resistance of the rack to movement.

SUMMARY OF THE INVENTION

Accordingly, a primary object of the present invention is to provide a yoke apparatus having a true kinematic design wherein bearing surfaces are maintained in coaxial alignment with the axis of movement of the rack to provide smooth, constant movement of the rack in both directions of travel. Another object of the present invention is to provide a yoke apparatus enabling generally shock and rattle free operation of the rack and pinion assembly.

Accordingly, in a preferred embodiment of the present invention, an improved yoke apparatus is presented wherein a bearing disc is biased to force the rack towards the pinion gear by a parallel pair of biasing members, preferably, a compression spring member and an elastomeric member, preferably an O-ring member. The bearing disc is slidingly located with reference to the housing bore of a conventional rack-and-pinion assembly at a transverse plane comprising the center of the rack. Generally however, it is formed in a tapered manner such that it is fixedly constrained in a lateral manner in that plane only. Most preferably, the bearing disc is barrel-shaped in a cross-section taken perpendicular to the direction of movement of the rack; in this regard, "barrel-shaped" refers to the general shape of a wooden wine or beer barrel, and not to the shape of a barrel which may house the rotary control valve assembly in a conventional power steering apparatus.

In addition to its axial biasing function, the O-ring member also provides compliant lateral constraints in a second plane which is axially displaced from that comprising the center of the rack. In so doing, the O-ring member acts similarly to an O-ring member described fully in my copending U.S. patent application Ser. No. 08/630,369 entitled "Yoke Apparatus for Rack and Pinion" which is expressly incorporated by reference herein. Because of the tapered configuration of the bearing disc and compliant support provided by the O-ring member of the preferred embodiment of the present invention, the above described over constraint is eliminated.

Preferably, the O-ring member is composed of rubber or another elastomeric material whose response to a force is highly non-linear; that is, it is highly compliant and experiences significant deformation under a relatively low force applied over a relatively long time, while it is not compliant and experiences limited deformation under a relatively large force applied over a relatively short time. Thus, in still further addition to its axial biasing function, the O-ring member acts as a shock absorber to substantially eliminate shock and rattle during operation of the rack and pinion assembly.

In a first aspect, then, the present invention is directed to a yoke apparatus useful in conjunction with a steering system having a pinion and a longitudinally movable rack engaged with the pinion, comprising: a bearing disc; and a pair of biasing members disposed in parallel with one another and each biasing the bearing disc against the rack, in turn biasing the rack against the pinion; wherein the biasing members have different spring constants and different compliances.

In a second aspect, the present invention is directed to a yoke apparatus useful in conjunction with a steering system having a pinion, a longitudinally movable rack engaged with the pinion and a sleeve with an aperture having a smooth portion, comprising: a barrel-shaped bearing disc received in the aperture; a pair of biasing members disposed in parallel with one another and each biasing the bearing disc against the rack, in turn biasing the rack against the pinion; and a plug adjustably received in the aperture and applying an axial load to the pair of biasing members; wherein the biasing members have different spring constants and different compliances, one of the biasing members being a compression spring member and the other of the biasing members being an elastomeric O-ring member having a highly non-linear compliance; and wherein the bearing disc includes a short circumferential outer surface having a diameter formed for sliding engagement with the smooth portion of the aperture and about which the bearing disc can pivot in response to an applied lateral shock.

In a final aspect, the present invention is directed to an improvement in a yoke for a steering system having a pinion and a longitudinally movable rack engaged with the pinion, the yoke having a bearing disc biasing the rack against the pinion, the improvement comprising a pair of biasing members disposed in parallel with one another and each biasing the bearing disc against the rack, wherein the biasing members have different spring constants and different compliances.

As fully described in incorporated U.S.patent application Ser. No. 08/630,369, the bearing disc initially moves with the rack. Because of this, no initial Coulomb friction is possible. As the bearing disc moves, it further compresses the trailing edge portion of the O-ring member and concomitantly relieves the leading edge portion of the O-ring member. This provides a force couple which causes a contra-pitch rotation of the bearing disc and opens a hydrodynamic bearing wedge for lubricant. As a result, exceptionally smooth operation results because the bearing surfaces of the bearing disc compliantly align with the preferred axis of movement of the rack in a manner that provides enhanced lubrication.

BRIEF DESCRIPTION OF THE DRAWINGS

The foregoing and other objects and advantages of the present invention will become readily apparent to those skilled in the art upon studying the following detailed description, when considered in connection with the accompanying drawings, in which.

DETAILED DESCRIPTION OF THE PREFERRED EMBODIMENTS

Figure 1:
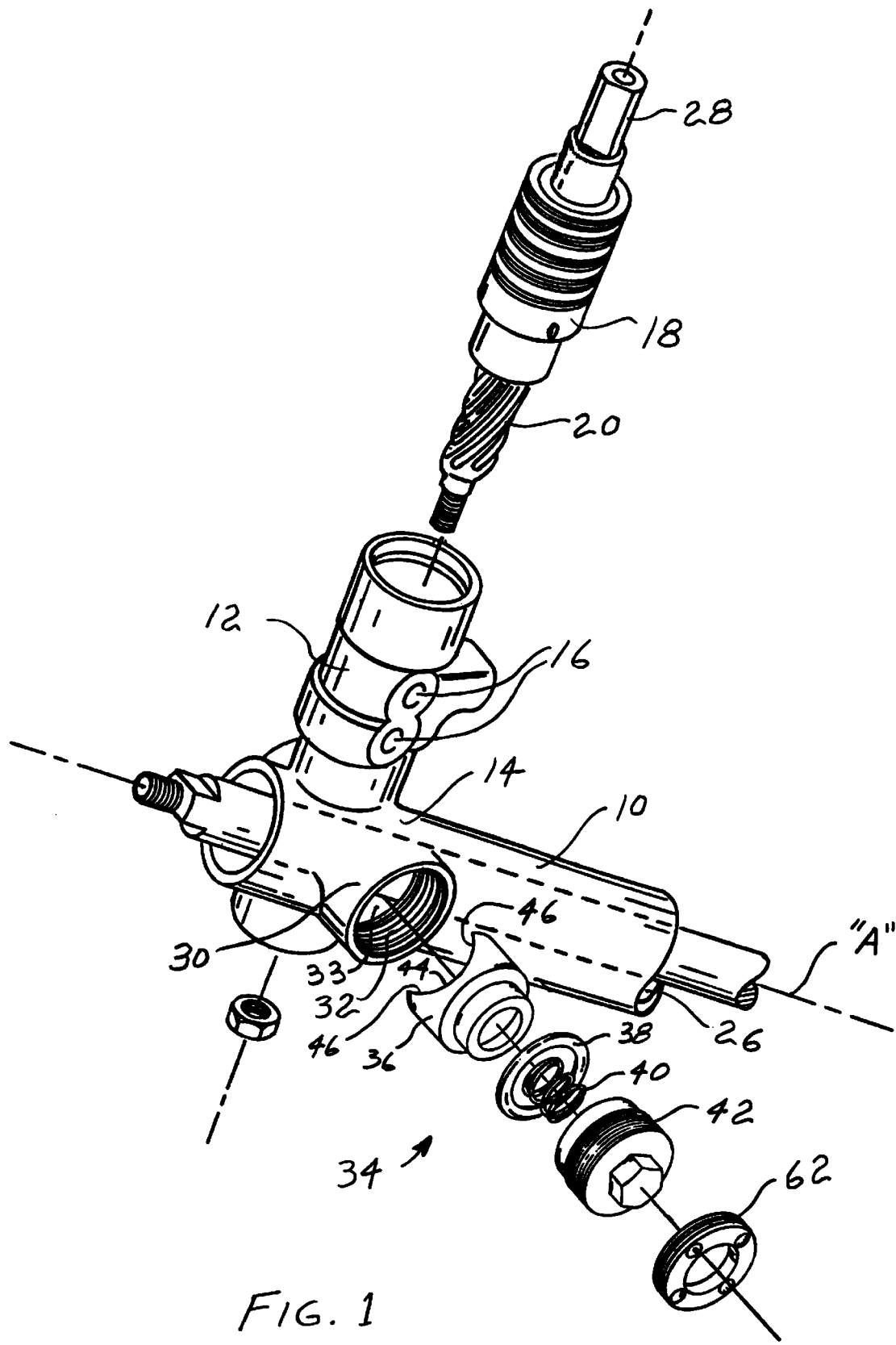
FIG. 1 is an exploded perspective view of a steering gear assembly including a yoke apparatus configured in accordance with a preferred embodiment of the invention.

Referring now to the exploded perspective view of FIG. 1, thereshown is a portion of a steering apparatus for a vehicle. The steering apparatus includes a conventional housing 10, such as manufactured by the Saginaw Steering Systems Division of Delphi Automotive Systems, of Saginaw, Michigan. The housing includes a barrel 12 extending upwardly from a cylinder 14. The barrel 12 houses a rotary control valve assembly 18 for providing pressurized hydraulic fluid through ports 16 to a hydraulic actuator (not shown) for providing hydraulic assist to the steering system. Included in the rotary control valve assembly 18 is a pinion gear 20. The pinion gear 20 is mounted to mesh with a plurality of teeth 22 (FIGS. 2 and 3) of a rack 24. The rack 24 is mounted for reciprocal movement along an axis of translation "A" in an elongated cavity 26 of the housing 10. As is known in the art, input shaft 28 of the rotary control valve assembly 18 is connected to a steering wheel (not shown) to enable steering of a host vehicle.

Figures 2, 3:
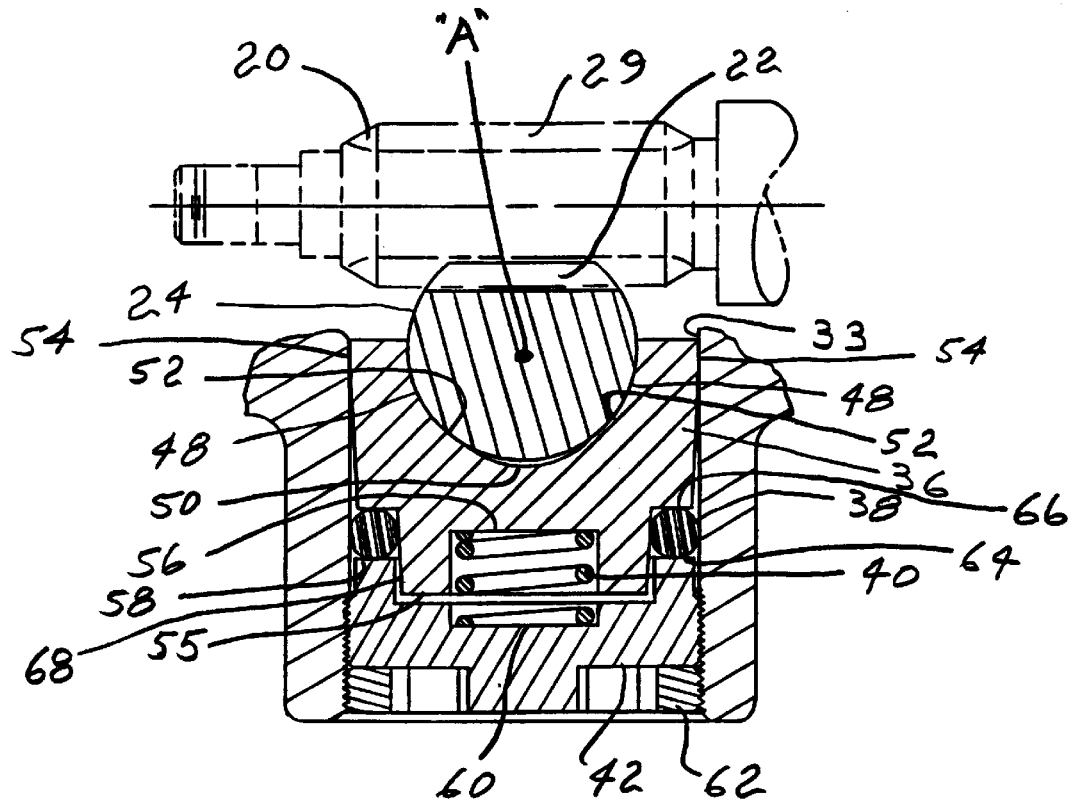
FIG. 2 is a sectional end view of the yoke apparatus of the preferred embodiment of the invention.
FIG. 3 is sectional side view of the yoke apparatus of the preferred embodiment of the invention.

As shown in FIGS. 2 and 3, the teeth 22 extend in a nominally axial direction along the surface of the rack 24. The teeth 22 are formed to mesh with a plurality of teeth 29 formed on the pinion gear 20 so that rotational movement of the pinion gear 20 by the steering wheel and rotary control valve assembly 18 will cause reciprocal translation of the rack 24 along the axis of translation "A". As is known in the art, the rack 24 is connected to dirigible wheels (also not shown) to steer the vehicle.

As shown in FIG. 1, a cylindrical sleeve 30 is formed on one side of the cylinder 14 of the housing. The cylindrical sleeve 30 includes a threaded aperture 32 for accepting an improved yoke apparatus 34 for biasingly supporting engagement of the teeth 22 with the pinion gear 20 in accordance with a preferred embodiment of the present invention. The threaded aperture 32 extends in a substantially orthogonal direction with reference to the axis of translation "A" of the rack 24.

The improved yoke apparatus 34 includes a bearing disc 36, an elastomeric O-ring member 38, a compression spring member 40 and an adjuster plug 42. When the improved yoke apparatus 34 is assembled within the cylindrical sleeve 30, the bearing disc 36 is biased against the rack 24 by the combined elastic deformation of the O-ring member 38 and the compression spring member 40.

As shown in FIGS. 1, 2 and 3, one side of the bearing disc 36 has a curvilinear slot 44 defining a pair of arms 46. The slot 44 is formed as a curvilinear surface 48 the center region of which is relived by offset smaller curvilinear surface 50 such that the rack 24 is supported by a pair of elongated bearing surfaces 52. The bearing surfaces 52 are spaced apart to guide the rack 24 during movement thereof.

As shown in FIG. 2, the bearing disc 36 has a short circumferential outer surface 54 having a diameter formed for a sliding engagement with a smooth portion 33 of the threaded aperture 32 of the cylindrical sleeve 30 at a transverse plane comprising the axis of translation "A". The remainder of the outer periphery of the bearing disc 36 is formed in a slightly conical manner thus providing diametral operating clearance for the bearing disc 36 other than at the plane comprising the axis of translation "A". The lower portion of the bearing disc 36 is formed with an extruded annular boss 55 for radially compliant location within the O-ring member 38 with reference to the smooth portion 33 of the threaded aperture 32. In addition, a pocket 56 is formed within the extruded annular boss 54 for receiving a first end of the compression spring member 40.

The adjuster plug 42 is formed with an extruded annular boss 58 for applying axial load to the O-ring member 38. In addition, a pocket 60 is formed within the extruded annular boss 58 for receiving a second end of the compression spring member 40. During assembly of the yoke apparatus 34, the adjuster plug 42 is threadably inserted into threaded aperture 32 and rotatably driven until both of the O-ring member 38 and the compression spring member 40 appropriately provide loading to the bearing disc 36. At this point an internal lock nut 62 is tightened against the adjuster plug 42 to maintain its position.

In operation, lateral and/or downward shock and rattle loading is imposed upon the improved yoke apparatus 34 by external forces applied to the rack 24. In part, the bearing disc 36 is supported against such shock and rattle loading by the O-ring member 38. This is achieved via further elastomeric deformation of the O-ring member 38 with reference to its constrained position between the bearing disc 36, adjuster plug 42 and the smooth portion 33 of the threaded aperture 32. With particular reference to the suppression of lateral shock, the circumferential outer surface 54 of the bearing disc 36 first makes firm contact with the smooth portion 33 of the threaded aperture 32. The bearing disc 36 then pivots slightly around the circumferential outer surface 54 in the direction of the applied lateral shock and allows the further elastomeric deformation of the O-ring member 38 as is described above. On-vehicle testing of the yoke apparatus 34 has been carried out; a significant reduction in shock and rattle, as well as in the noise associated with shock and rattle, has been observed in comparison to steering systems incorporating other yoke structures.

In the steady state condition, the O-ring member 38 is elastically deformed between the fixed end surface 64 of the adjuster plug 42 and the smooth portion 33 of the threaded aperture 32, and the supported shoulder 66 and curved surface 68 of the bearing disc 36. In effect, this support system exactly mimics the support of bearing disc 36 of incorporated U.S. patent application Ser. No. 08/630,369 via an O-ring member 38, and angular contact grooves 52 and 54 described therein. As is fully described in that patent application, this causes pitch motions of the bearing disc 36 to occur in a contra-pitch manner about an apex 70 so as to form a lubrication wedge between it and the rack 24. The kinematic design of the improved yoke apparatus 34 permits the axis of the bearing surfaces 48 of the bearing disc 36 to be in precise alignment with the rack 24 and maintain a lubrication wedge therebetween which enables smooth movement of the rack 24.

Accordingly, disclosed above is an improved yoke apparatus of compact design which may be substituted for a conventional yoke apparatus in any rack and pinion steering gear to substantially eliminate shock and rattle as described above, and further, to significantly improve its smoothness of operation. The ideally supported bearing disc 36 permits perfect alignment and improved lubrication of its support surfaces of the otherwise conventional steering system's rack 24. Accordingly, the rack 24 moves smoothly in either direction with minimal hysteresis due to Coulomb friction.

INDUSTRIAL APPLICABILITY

The present invention is directed to a yoke for rack-and-pinion steering assemblies, and therefore finds use in automotive vehicles and the like.

I claim:

1. A yoke apparatus (34) useful in conjunction with a steering system having a pinion gear (20) and a longitudinally movable rack (24) engaged with the pinion gear (20) mounted within a housing, said housing having a sleeve formed to receive said yoke assembly, the sleeve having a smooth cylindrical inner wall, said yoke apparatus comprising:

a bearing (36) having an outer circumferential wall and a boss, said boss extending in an axial direction from a lower portion of said bearing disc, said circumferential wall having a lower portion adjacent said lower portion of said bearing disc, said lower portion being spaced inwardly and apart from said inner wall of said sleeve; and a pair of biasing members (40 and 38) disposed in parallel with one another and adapted to bias the bearing disc (36) against the longitudinally movable rack (24), in turn biasing the longitudinally movable rack (24) against the pinion gear (20), one of the biasing members mounted between the lower portion of said bearing disc and said boss to constrain the disc in a lateral direction;

wherein the biasing members (40 and 38) have different spring constants and different compliances.

2. The yoke apparatus (34) according to claim 1, wherein the one biasing members (40 and 38) is an elastomeric member (38) and an other of the biasing members (38 and 40) is a compression spring member (40).

3. The yoke apparatus (34) according to claim 2, wherein the elastomeric member (38) is an O-ring member (38).

4. The yoke apparatus (34) according to claim 1, wherein the bearing disc (36) is barrel-shaped.

5. The yoke apparatus (34) according to claim 1, wherein one of the biasing members (40 and 38) is composed of an elastomer having a highly non-linear compliance.

6. A yoke apparatus (34) for use with a steering system having a pinion gear (20), a longitudinally movable rack (24) engaged with the pinion gear (20) mounted within a housing, said housing having a sleeve (30) with an aperture (32) having a smooth portion (33) adapted to receive said yoke apparatus, said yoke apparatus comprising:

a barrel-shaped bearing disc (36) adapted to be received in the aperture (32);

a pair of biasing members (40 and 38) disposed in parallel with one another and each biasing the bearing disc (36) against the rack (24), in turn adapted to bias the rack (24) against the longitudinally movable pinion gear (20); and a plug (42) adjustable received in the aperture (32) and applying an axial load to the pair of biasing members (40 and 38);

the biasing members (40 and 38) have different spring constants and different compliances, one of the biasing members (40 and 38) being a compression spring member (40) and the other of the biasing members (38 and 40) being an elastomeric O-ring member (38) having a highly non-linear compliance; and the bearing disc (36) having a circumferential outer surface (54) having a diameter formed for sliding engagement with the smooth portion (33) of the aperture (32) and having a lower portion spaced inwardly and apart from said smooth portion such that the bearing disc (36) can pivot in response to an applied lateral shock.

7. The yoke apparatus of claim 6, wherein the outer circumferential surface of the bearing disc further comprises a conic shape, said circumferential surface tapering inwardly in the direction of the plug.

* * * * *